United States Patent [19]

Vockenhuber

[11] 4,148,072
[45] Apr. 3, 1979

[54] CAMERA SYSTEM INCLUDING A STILL OR MOTION PICTURE CAMERA AND A TV CAMERA

[75] Inventor: Karl Vockenhuber, 118 Pötzleinsdorferstrasse, 1180 Vienna, Austria

[73] Assignees: Karl Vockenhuber; Raimund Hauser, both of Vienna, Austria

[21] Appl. No.: 683,676

[22] Filed: May 5, 1976

[30] Foreign Application Priority Data

May 5, 1975 [AT] Austria .................................. 3429/75

[51] Int. Cl.² .......................... H04N 5/30; H04N 5/30
[52] U.S. Cl. ..................................... 358/224; 358/227
[58] Field of Search ........................ 352/131, 170, 171; 358/97, 225, 227, 229, 224, 210; 354/221, 222, 289, 219, 225, 53, 198, 199

[56] References Cited

U.S. PATENT DOCUMENTS

| 2,384,232 | 9/1945 | Beers | 358/224 |
| 2,420,197 | 5/1947 | Rosenthal | 358/97 |
| 2,831,057 | 4/1958 | Orthuber | 358/227 |
| 2,854,885 | 10/1958 | Robinson et al. | 358/227 X |
| 3,212,422 | 10/1965 | Nerwin et al. | 354/199 |
| 3,225,140 | 12/1965 | Ferber et al. | 358/97 |
| 3,435,136 | 3/1969 | Bachmann et al. | 358/227 X |
| 3,486,432 | 10/1969 | Norwood | 352/171 |
| 3,541,941 | 11/1974 | Barr et al. | 358/227 X |
| 3,590,682 | 7/1971 | Ort et al. | 354/225 |

FOREIGN PATENT DOCUMENTS

| 1447564 | 1/1969 | Fed. Rep. of Germany | 354/198 |
| 2519570 | 4/1975 | Fed. Rep. of Germany | 358/227 |

Primary Examiner—Robert L. Griffin
Assistant Examiner—Aristotelis M. Psitos
Attorney, Agent, or Firm—Fleit & Jacobson

[57] ABSTRACT

A camera system including a photographic camera of the still or motion picture type and a TV camera each having an adjustable lens system and arranged for operation together with an electronic circuit connecting together the adjustable lens systems of the two cameras so that the object angle of the TV camera follows changes in the object angle of the photographic camera thereby producing an output signal in the TV camera which indicates the particular object field of the photographic camera.

8 Claims, 4 Drawing Figures

CAMERA SYSTEM INCLUDING A STILL OR MOTION PICTURE CAMERA AND A TV CAMERA

This invention concerns a system consisting of a still or motion-picture camera and a TV camera wherein at least the lense of the still or motion-picture camera has a variable object angle, preferably smaller or equal to the object angle of the TV camera, and a device which is controllable in tandem with any change in the object angle of the still or motion-picture camera and which at the output signal of the TV camera, indicates the particular object field of the still or motion-picture camera.

BACKGROUND OF THE INVENTION

A movie camera with which a TV camera is associated for the purpose of reproducing the object photographed by the movie camera is well known. To this end, a semipermeable mirror or the like is provided in the radiation path of the optical viewfinder of the movie camera which mirror transmits the picture of the object to the radiation path of the TV camera. The movie camera and the TV camera are made integral. With such a system, as is well known, it becomes possible, for example, to monitor the picture taking of the movie camera, that is, to control it from a single position. Several TV reproduction monitors are set up at this location which are monitored by an operator.

Fundamentally, movie cameras of the type described above have the disadvantage that complex and costly optical arrangements must be provided to conduct the object radiation onto the picture tube of the TV camera. Moreover, with such an arrangement, considerable loss in brightness with respect to the object being observed through the viewfinder of the movie camera occurs. Also, assembly and disassembly is time consuming as well and furthermore, it is not practical for other types of use. It is also known that it is feasible to mutually couple the lens of movie apparatus with the lens of a TV camera mutually in such a way as to produce simultaneous focussing, the same change in image angle, an adjustment of parallax, and the same depth-of-focus range of the two mutually associated lenses.

Summary of the Invention

The invention thus enables the production of a system making it possible, to photograph the same object as does the movie-camera and thereby permit monitoring while utilizing a TV camera of any desired design which may be used independently. Such a system according to the invention eliminates any action taken or changes in the lens system of the movie camera. Thus, with the invention a system of the above-mentioned type contemplates the provision of an electrical signal derived from the setting of the object angle of a still or motion-picture camera which is fed, preferably through a cable to an electric or electro-mechanical servo device for the purpose of setting the object field of the TV camera wherein preferably the servo-mechanism has associated with it terminal switch-offs which are provided to activate signal devices as needed.

The system according to the invetion using the respective devices is capable of linking any desired type of movie camera with any desired type of TV camera in the most advantageous manner so that when focussing on the same object reproduction of the object is made possible on a TV screen or the like with the object field defined by the object angle of the still or motion-picture camera clearly discernible on the reproducing device. No action is necessary with respect to the optical system of the still or motion-picture camera. The only elements that must be controlled in common and interdependently with respect to their physical design are the devices for setting the object angle or the object field of the two cameras.

BRIEF DESCRIPTION OF THE DRAWINGS

The drawings show the various embodiments of the invention by way of example.

FIG. 5 shows an embodiment using a size-adjustable mask which is positioned in the radiation path of the lens of the TV camera.

DESCRIPTION OF THE PREFERRED EMBODIMENTS

A movie camera may rest on a column of the pedestal (not shown). A piece of slide track may also be fixed to the bottom of the movie camera 1 to secure a TV camera 4 in position. The TV camera 4 serves the purpose of reproducing the object photographed by the movie camera and is, for that purpose, arranged parallel to the optical axis of the photographic lens of the movie camera 1. The object photographed by the TV camera 4 is displayed on a monitor connected with the output of the TV image signal of the TV camera through a suitable lead. FIG. 5 illustrates diagrammatically a movie camera and shows the direction of motion of the adjustable aperture.

The use of such a combination of a movie camera and TV camera makes it possible for a director to achieve an economical and dramatically desirable use of the movie camera. From his post, the director by the use of a monitor can control the starting of each separate movie camera through a device that reports back to him. Any desired movie camera can therefore be used with any desired TV camera to produce the desired result. The TV camera has its own lens, so that nothing need be done to the optical system of the movie camera. Furthermore, the TV camera 4 can be disconnected in a simple way from the movie camera 1 and used for other transmission purposes.

Figure 1:
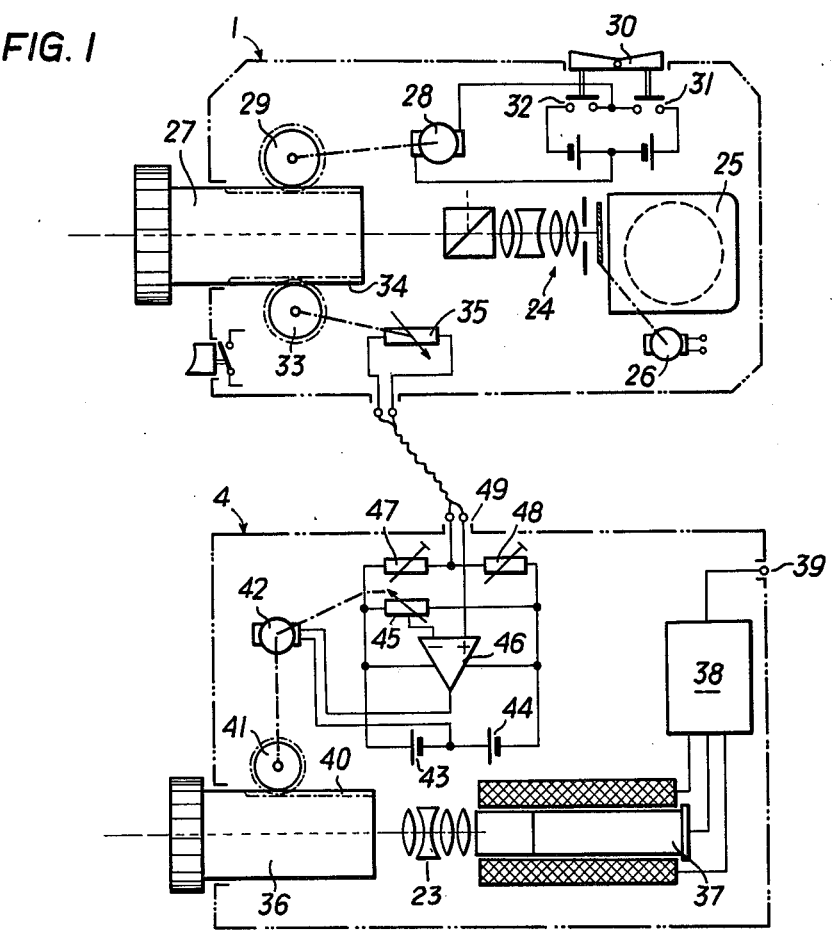
FIG. 1 shows the joint system of a motion-picture camera and a TV camera, with one embodiment for transmitting the object angle setting.

Referring now to the drawings wherein like numerals refer to like parts and to FIG. 1 in particular, movie camera 1 is provided with a basic lens 24. Cassette 25, loaded with film, is placed behind this basic lens 24 and an electric motor 28 is provided to drive the film transport mechanism and shutter. By moving a tubular element 27, the focal length or the object angle of the photographic lens 24 may be adjusted. The tubular element 27 has teeth 34 for this purpose which mesh with with a gear wheel 29 that is driven by the electric motor 28. By depressing rocker switch 30, contacts 31,32 are selectively closed causing electric motor 28 to rotate in different directions. This will produce through the gear link between tubular element 27 and electric motor 28, an enlargement or a reduction of the object angle of the lens 24 depending on how long switch 30 is depressed.

Another gear wheel 33 is provided which meshes with the teeth 34 of tubular element 27. Gear wheel 33 is provided which is rigidly fitted onto the brush of a potentiometer 35. The binding posts of potentiometer 35 protrude from movie camera 1. The resistance level of the potentiometer as set by gear wheel 33 through the gear link to tubular element 27 always corresponds to a specific object angle.

TV camera 4 also has a lens with infinitely adjustable object angle and includes a basic lens 23 and a tubular element 36 which has the function of object angle setting. Behind basic lens 23 is a TV picture tube 37 which is connected to electronic assembly 38. This electronic assembly comprises all of the stages necessary for processing the image acquired by picture tube 37 into signals that can be picked up at the output 39 of TV camera 4 and supplied to an electronic display device.

Setting the focal length, that is, the object angle of lenses 23 and 36 is done by means of the toothed crown of a gear wheel 41 which meshes with tubular element 36, the wheel being driven by motor 42. Motor 42 is connected to an electronic servo-mechanism comprising essentially a Wheatstone bridge and two series-connected batteries 43, 44. One side of this Wheatsone bridge is made up of potentiometer 35 controlled by movie camera 1. The other side of the Wheatstone bridge is formed by a second potentiometer 45 connected to TV camera 4 through gear wheel 41. The tap on that branch of the bridge with potentiometer 35 is connected to one input, the tap of the other branch (potentiometer 45) to another input of differential amplifier 46, the output of amplifier 46 being connected to one binding post of motor 42. The other binding post of the motor 42 is connected into the middle tap between power sources 43, 44.

Potentiometer 35 generates an electric potential as determined by its resistance level that corresponds to the object angle of movie camera 1. To this end, potentiometer 35 can be made integral with movie camera 1 or it be left outside the camera perhaps in form of an adapter, with which the shift mechanism of the photographic lens 24 is associated. The servo-mechanism of TV camera 4 similarly has, in the form of potentiometer 45, a device that generates electric potential in relation to the object angle setting of lenses 23, 36. When the object angle settings and the adjustments of the lenses of both movie camera 1 and TV camera 4 are the same and potentiometers 35 and 45 are set in the same position, the output of differential amplifier 46 will apply power to electric motor 42 until lenses 23, 36 register the same object angle setting as the lenses 27, 24 of movie camera 1.

If, however, lens 23, 36 of TV camera 4 is set in a different position than the lens of the movie camera 1, the constructive deviations of the lens of the TV camera must be compensated through additional resistances 47, 48 in that part of the bridge associated with potentiometer 35. The size of these resistances will depend on the characteristics of the two lenses. Advantageously, resistances 47,48 are designed as adjusting governors so that TV camera 4 may be readily adapted to any desired movie camera 1.

Figure 2:
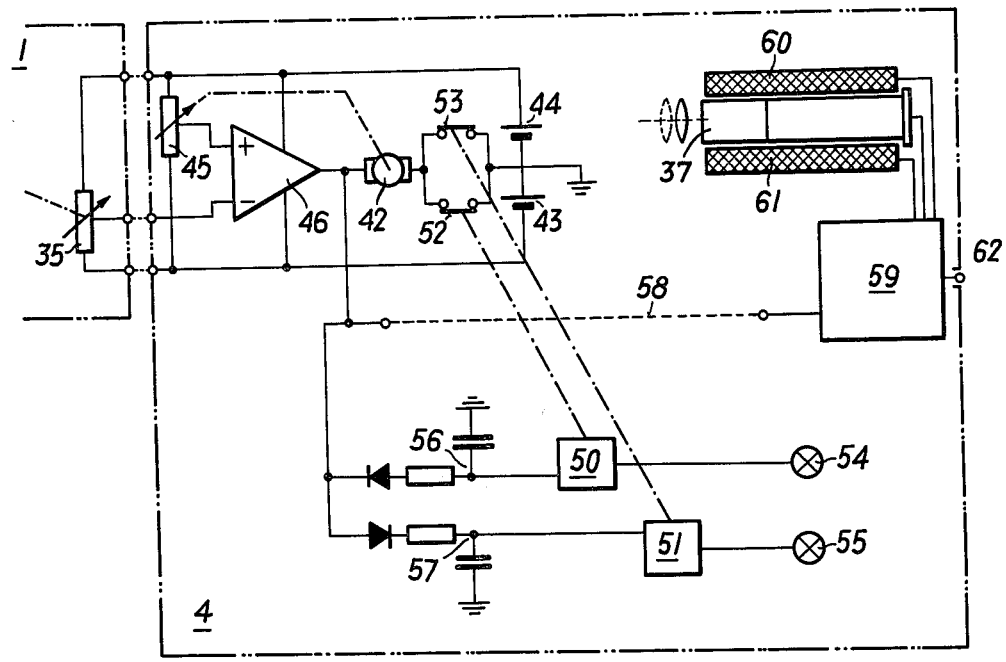
FIG. 2 is a diagrammatic illustration of the circuitry of a second embodiment for transmitting the object angle.

If TV camera 4 is used separately from movie camera 1 and by itself, a potentiometer could, for example, be connected to binding post 49 in the same way that potentiometer 35 is associated with movie camera 1 which potentiometer would then be used to actuate the focal-length setting mechanism 40, 41,42. Such a potentiometer can be installed directly in TV camera 4 and disconnected from its contacts 49 by way of an adapter switch, not shown in the drawings. In FIG. 2, the potentiometer associated with the object angle setting mecahnism of the movie camera is identified by the numeral 35 as in the embodiment of FIG. 1. The potentiometer coupled with the adjustment mechanism for the lens of TV camera 4 is designated by the numeral 45 as in the embodiment of FIG. 1.

The voltage dividers formed by potentiometers 35 and 45 make up a Wheatsone bridge, the contacts or brushes of the potentiometers connected to differential amplifier 46. Electric motor 42 sets the object angle of the lens (not shown) of TV camera 4 and is connected with the middle contact tap of power source 43,44 through two inactive contacts 52, 53 that are connected in series with respect to each other. If the servo-mechanism is unable to set the object angle of the movie camera lens as called for by the lens (not shown in FIG. 2) of TV camera 4, the output of differential amplifier 46 will continue to apply power to supply motor 42 after the tubular element 36 of the TV camera lens has reached its end position.

In order, first, to avert damage to the electronic drive, and secondly, to afford the cameraman a warning that the object angles of the two lenses do not coincide, switches are provided at the output of differential amplifier 46 which in such a case disconnect the current to the electric motor 42 and also set off signal lights, sound warnings or the like visible to the director or cameraman. The power supply to electric motor 42 is cut by means of one of the inactive contacts 52 or 53, depending on the direction in which the motor is rotating. A relay or similar device can be connected to switching steps 50, 51, in order to control these contacts.

To avoid the switching steps 50, 51 setting off the signal devices 54, 55 or cutting the power to electric motor 42 during a servo follow-through of the object angle setting mechanism of the TV camera timers 56, 57 are connected ahead of each switching step, the timers having a time constant greater than the longest possible phase of servo follow-through of the object angle setting mechanism. This accomplishes two things. First, the object angle setting can be followed through, and, secondly, if this follow-through cannot be done, the servo mechanism is automatically shut off, and the warning devices such as signal lights 54, 55 or the like go into action.

Normally, in the TV camera, the deflection field of the cathode rays is adjusted so that it correspond to the deflection field of the photosensitive surface of the picture tube. To this end, the deflecting streams in the deflection coils of the TV picture tube are adjusted to a constant level. If, however, we alter the size of the deflection field by shifting the deflection streams, the object field will, for example, be displayed on a monitor in various sizes with respect to the size of the monitor screen, depending on how the deflection streams are chosen.

Figure 4:
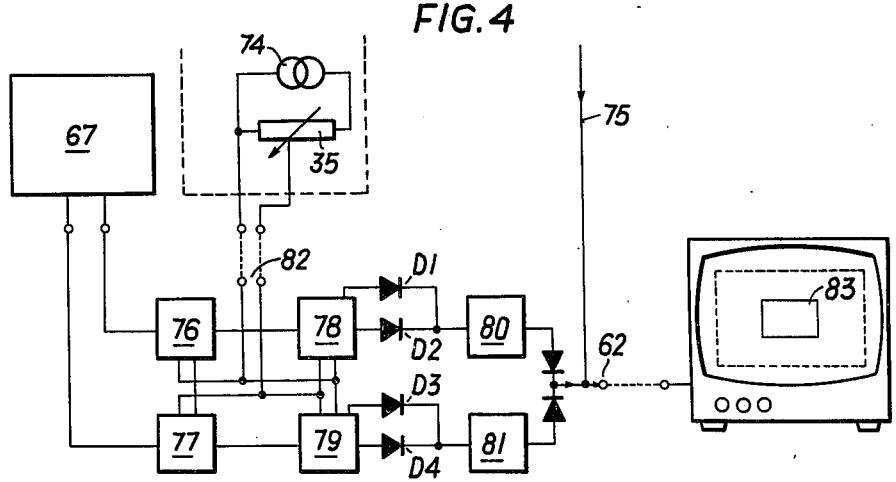
FIG. 4 illustrates diagrammatically a fourth embodiment for transmitting illustrates a fourth design for transmitting the angle setting from a movie camera to a TV camera.

These features can likewise be used to adapt the object angle of a TV camera to that of movie camera or the like as shown in FIG. 4.

According to FIG. 2, the lead 58 shown in broken lines connects the electronic assembly 59 to TV camera 4. The electronic assembly 59 supplies current to deflection coils 60, 61. The output of the TV picture tube is similarly connected to the electronic unit. From binding post 62, the TV picture signal can be transmitted to any screen desired. As described, switching devices 50, 51 are provided as shown in FIG. 2, which shut down the servo follow up mechanism for the object angle setting of the TV camera lens, if, for reasons of the design of the latter, an identical setting of the movie camera lens cannot be made. The electronic assembly 59 has at its input to which lead 58 is connected, a detector which ascertains the level of the control voltage for electric motor 42 at the output of differential amplifier 46 and, depending thereon, either reduces or enlarges the deflection field of picture tube 37. The detector at the input of the electronic assembly 59 should be so designed that the deflection field can only be altered when the limits of the adjustable shift mechanism of the TV camera lens have been reached. If the TV camera 4 is equipped with this kind of device for altering the deflection field, signal lights 54, 55 can be eliminated.

To be able to alter the deflection field, the detector for electronic assembly 59 must be connected to the servo device in such a way so that it can be supplied with a voltage which corresponds to the actual setting of the shift mechanism. If current is supplied to electric motor 42 by the differential amplifier through the switching stages or, in other words, if it receives a voltage at a constant level until the desired setting of the shift mechanism is reached, the electronics should be supplied ahead of these switching steps.

It is further possible to substitute a control device for the deflection streams of deflection coil 60, 61 for the entire electromechanical servo-mechanism that effects the object angle setting of movie camera 1. In that case, the detector of such an electronic arrangement need only have a control range corresponding to the object angle setting of the movie camera.

Figure 3:
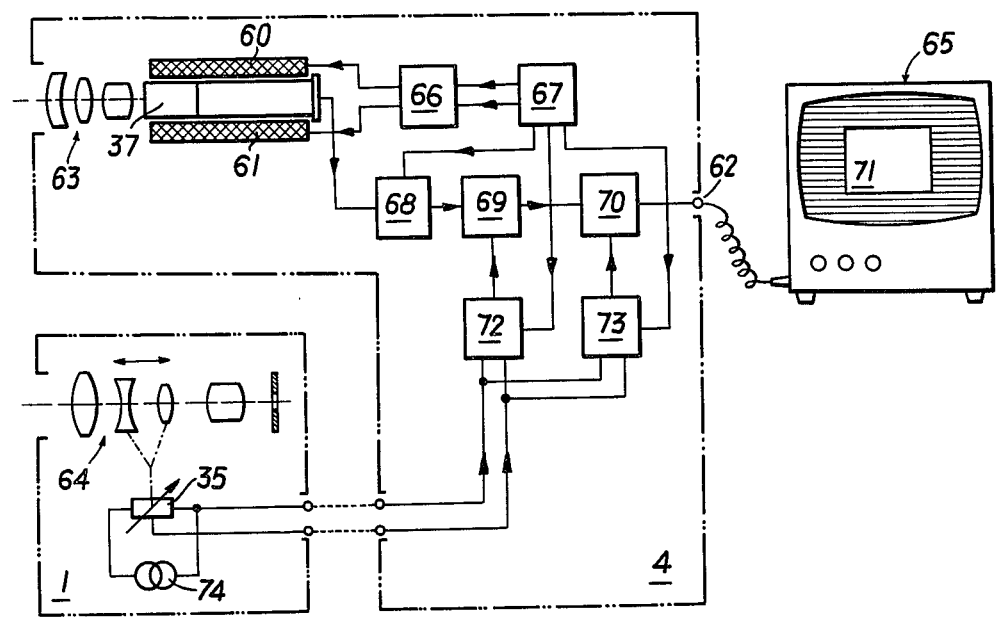
FIG. 3 is a diagrammatic illustration of the circuitry of a third embodiment for transmitting the object angle setting.

FIG. 3 shows another embodiment of an electronic adjustment of the image field of a TV camera as a function of the object angle setting of a movie camera lens. The TV camera 4 has a lens 63 with fixed focal length. Lens 64 on movie camera 1 has an adjustable focal length. On output binding post 62 of the electronic circuitry of TV camera 4, a picture signal which makes up an object field on display screen 65 can be tapped off, this field being defined by the object angle of movie camera lens 64. Deflection coils 60, 61 of the picture tube 37 are connected to a deflection stage 66 that receives current from an impulse distributor 67. The signal from the TV picture tube 37 is supplied via an image signal amplifier 68 to the gates 69 and 70. The open periods that gates 69 and 70 have in common define the position and size of object field 71 that is displayed on the monitor screen. The vertical and horizontal synchronized impulses derived from impulse distributor 67 are fed to delay stages 72 and 73. Delay stages 72 and 73 each have an input for the control voltage, the level of which is defined by the delay time. If a control voltage that is given by the object angle setting of movie-camera lens 1, 64 is fed to the impulse delay stages 72, 73 the TV image signal at the output binding post 62 will display those parameters which act to reproduce the object field 71 that is defined by the object angle of lens 64. The control voltage for the impulse delay stages 72, 73 can be in simple manner generated by a voltage divider 35 which is connected to a constant current source 74; the pick-up of the voltage divider is controlled by the slideable elements of lens 64.

Finally, FIG. 4 represents schematically a circuit which admixes with a television image signal such that an image signal may be tapped off at the output 62 of a TV camera which contains data for reproducing the photographed object and for reproducing a luminous frame of varying size. The television image signal is carried through lead 75 to the terminal binding post 62. Both vertical and horizontal synchronizing impulses are retarded momentarily in primary mono-stable multivibrators 76, 77 by sync-generator 67. The output signal of these two multi-vibrators 76, 77 is retarded once more in the multi-vibrators 78, 79. Since the multivibrators 78 and 79 each have a positive and a negative output, a switching pulse of suitable polarity may be supplied to the subsequent monostable multi-vibrators 80, 81, via diodes D-1 to D-4 at each switch flank of multivibrators 78,79. Thereupon the data impulses for luminous frame 83 appear at the outputs of the monostable multi-vibrators 80, 81. A control voltage may be supplied to the sweep-circuit oscillators for setting the delay time via the terminals 82, which define the position and size of luminous frame 83 in relation to the image photographed by the TV camera. If the control voltage is shunted off from the object angle setting of the motion-picture camera lens (for example, by means of potentiometer 35 and constant current source 74, both coupled with the motion-picture camera) the object angle setting of the movie camera is contained in the television signal at terminal post 62. By using such a switching arrangement, the television camera may be designed with a fixed focal length, which defines the object field of the movie camera by the luminous frame that is readily visible on the monitor screen.

According to the embodiments described herein, all that is needed to couple a still or movie camera with a TV camera is a device to produce a setting level at the cameras, another device to transmit this level and a device to convert this level into an object angle setting for influencing the television image signal. These devices can be made in a simple manner as accessories of the cameras without having to do anything to the optic system of the movie camera. Instead of potentiometer 35 on the movie camera (or the still camera) any kind of path/voltage transformer may be used. Moreover, placing a photoconductive cell with an associated light source may be used in lieu of potentiometer 35 in which arrangement an object angle setting mechanism with a variable a shutter diaphragm is placed between these two units. As has been described, a Bowden control cable or an electric wire may be used transmit the setting levels. It is also conceivable to provide a wireless link for the setting mechanisms. This can be done by means of a high frequency, supersonic or infrared transceiver. A wireless transmission of the television image signals to a replay screen, as for example to the director's post, may be possible.

To give both cameras an equivalent object angle setting or to influence the television image signal so that the object angle of the motion-picture camera (or of the still camera) would be visible on a monitor screen or the like, it would be feasible to combine the electromechanical or electronic switching arrangements of all of the embodiments. Finally, it may be pointed out that the parallax errors caused by the cameras mounted adjacently or superjacently may, if necessary, be compensated electronically in such a way that the deflection field of picture tube 37, the image field 71, or the luminous frame 83 are arranged suitably shifted with respect to the photosensitive field of camera tube 37. The coupling alternatives of the two cameras, as has been described, are not limited only to a movie camera or a TV camera. Fundamentally, it would be possible to couple a still camera with a movie camera or with a TV camera, or even two TV cameras together.

Limiting or setting the object field of the TV camera can also be done by placing a mask in the radiation path of the picture-taking lens of the TV camera to restrict the object field. This mask should be so designed that its aperture or its edges are adjustable. In this regard, reference is made to FIG. 5 which shows the adjustable aperture mask 85. The adjusting mechanism would then be coupled by means of an electro-mechanical coupling or servo-mechanism with the cameras, such coupling means is shown diagrammatically at 86 and 87. If the adjustable mask 85 is placed in the depth of sharpness of the TV camera lens, the limits of the object field would show sharply on the photosensitive surface of the TV picture tube. If the adjustable mask 85 is outside of the depth of sharpness of the TV camera lens, it will, to be sure, make the object field as defined by the object angle of the still or movie cameras clearly visible. However, the object outside this field will be very much darker.

The last-named alternative arrangement of an adjustable mask has the advantage that it can be attached as a readily mountable adapter ahead of and outside of the TV camera lens.

Setting the object angle as defined by the lens of a movie or still camera can also be done by having the mask with fixed edges displaced in the radiation path of the TV camera lens by an electromechanical, servo-mechanism. In that case, the object field of the TV camera will be altered in proportion to the distance of the mask from the TV camera lens.

I claim:

1. A camera system comprising, in combination, a photographic camera means of the still or motion picture type for photographing an object field, a TV camera having a first lens means for providing a variable object angle, said photographic camera means having a second lens means for providing a variable object angle less than or equal to said object angle of said TV camera lens means independently thereof, means for adjusting said second lens means to different object angle settings, means for providing an electrical signal in said photographic camera means corresponding to said photographic camera lens means object angle settings, said TV camera comprising an electrically-operated servo-mechanism means for adjusting the object field of said TV camera lens means, means for providing said electrical signal from said photographic camera to said servo-mechanism means, said servomechanism means comprising means for adjusting the object field of said TV camera lens means corresponding to said object angle setting of said photographic camera lens means.

2. A camera system as claimed in claim 1 wherein said lens means for providing a variable object angle of said photographic camera comprises a tubular element, said means for adjusting said lens means comprises an electric motor and means for interconnecting said electric motor to said tubular element for moving said tubular element, said means for providing an electrical signal in said photographic camera means comprises a potentiometer and means for interconnecting said tubular element to said potentiometer whereby movement of said tubular element changes the output signal of said potentiometer.

3. A camera system as claimed in claim 2 wherein said servomechanism means of said TV camera comprises a differential amplifier, means for providing said output signal of the potentiometer of said photographic camera to one input of said differential amplifier, a second potentiometer having one lead connected to a second input of said differential amplifier, the output of said differential amplifier connected to a second electric motor, said second electric motor mounted in said TV camera, said second electric motor connected to said second potentiometer and to said means for adjusting the object field of said TV camera.

4. A camera system as claimed in claim 3 further comprising a mask having an adjustable aperture positioned in the radiation path of the lens of the TV camera, and means for interconnecting said mask with said servomechanism means, wherein said mask defines the object field of said TV camera.

5. A camera system as claimed in claim 3 further comprising switch means for disabling said second motor when said output signal of said differential amplifier remains beyond a predetermined time period.

6. A camera system comprising, in combination, a photographic camera means of the still or motion picture type for photographing an object field, a TV camera, said photographic camera means having a first lens means for providing a variable object angle less than or equal to an object angle of a second variable object angle lens means of said TV camera, means for adjusting said first lens means to different object angle settings, means for providing an electrical signal corresponding to said object angle settings of said first lens means, means for providing said electrical signal to deflection coil means in the picture tube in said TV camera for generating a deflection field corresponding to said object angle of said TV camera, and gating means for gating the video output of said picture tube to correspond to the object angle of said photographic camera, said gating means being controlled by said electrical signal output of said photographic camera.

7. A camera system comprising, in combination, a photographic camera means of the still or motion picture type for photographing an object field, a TV camera, said photographic camera means having a lens means for providing a variable object angle less than or equal to an object angle of said TV camera, means for adjusting said lens means to different object angle settings, means for providing an electrical signal in said photographic camera means corresponding to said object angle settings, a TV receiver, means for providing an output signal of said TV camera to said TV receiver, means for adjusting the output signal of said TV camera corresponding to said object angle of said photographic camera comprising circuit means for adjusting the output signal of said TV camera corresponding to said electrical signal output of said photographic camera.

8. A camera system comprising, in combination:
a TV camera having a TV lens means for providing a variable object angle, deflection coils for generating a deflection field;
means for adjusting the size of the deflection field generated by said deflecting coils and means for adjusting the object field of said TV lens means;

a photographic camera means having a tubular lens means for providing a variable object angle less than or equal to the object angle of said TV lens means and being variable independently thereof;

means for adjusting said tubular lens means to different object angle settings and having an electric motor mechanically connected to said tubular lens means for movement thereof;

means for providing an electrical signal corresponding to the object angle settings of said tubular lens means having a potentiometer mechanically connected to said tubular lens whereby movements of said tubular lens means changes the impedance of said potentiometer and changes said electrical signal;

means for providing said electrical signal from said photographic camera to said means for adjusting the object field of said TV lens means which includes;

differential amplifier means having a first input for receiving said electrical signal and a second input having one lead of a second potentiometer connected thereto, the output of said differential amplifier being connected to a second electric motor mounted in said TV camera said second electric motor connected to said second potentiometer and to said means for adjusting the object field of said TV lens means; and means in said TV camera connected to the output of said differential amplifier for adjusting the size of the deflection field generated by said deflection coils in proportion to the output voltage of said differential amplifier.

* * * * *